Aug. 4, 1931.  G. E. ARMINGTON  1,817,602
DUMP WAGON DOOR OPERATING GEAR
Filed Nov. 21, 1930  3 Sheets-Sheet 3
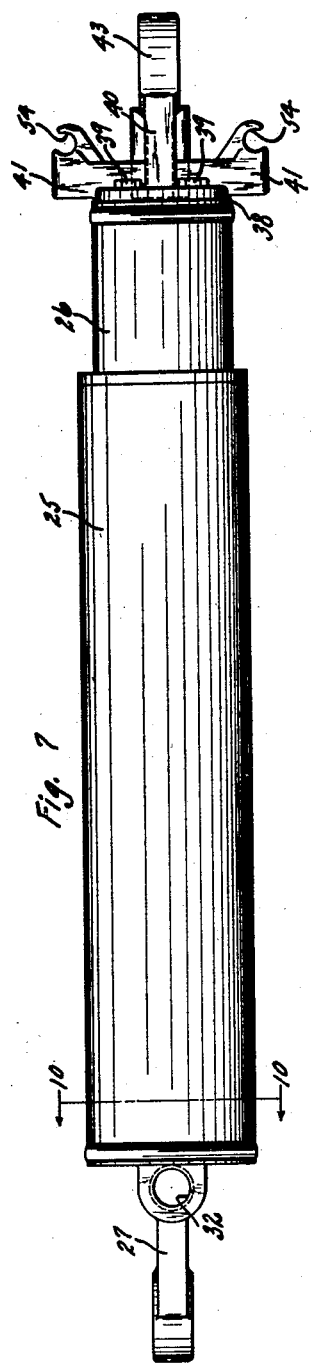
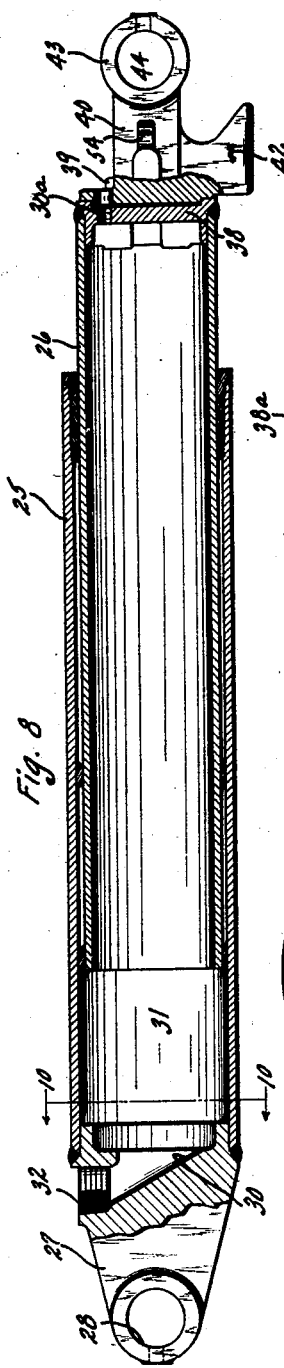
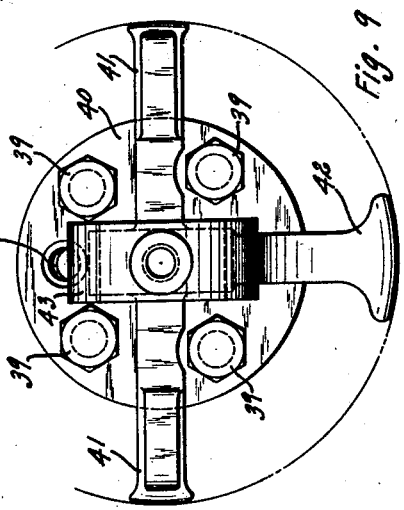
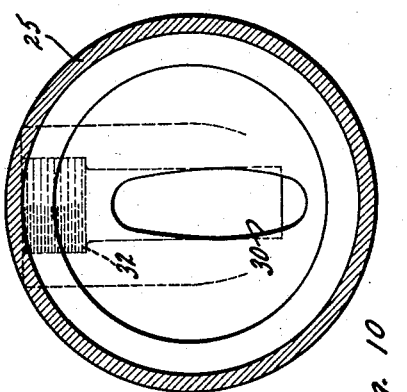
INVENTOR
George E. Armington
BY
Brockett, Hyde, Higley & Meyer
ATTORNEYS Patented Aug. 4, 1931

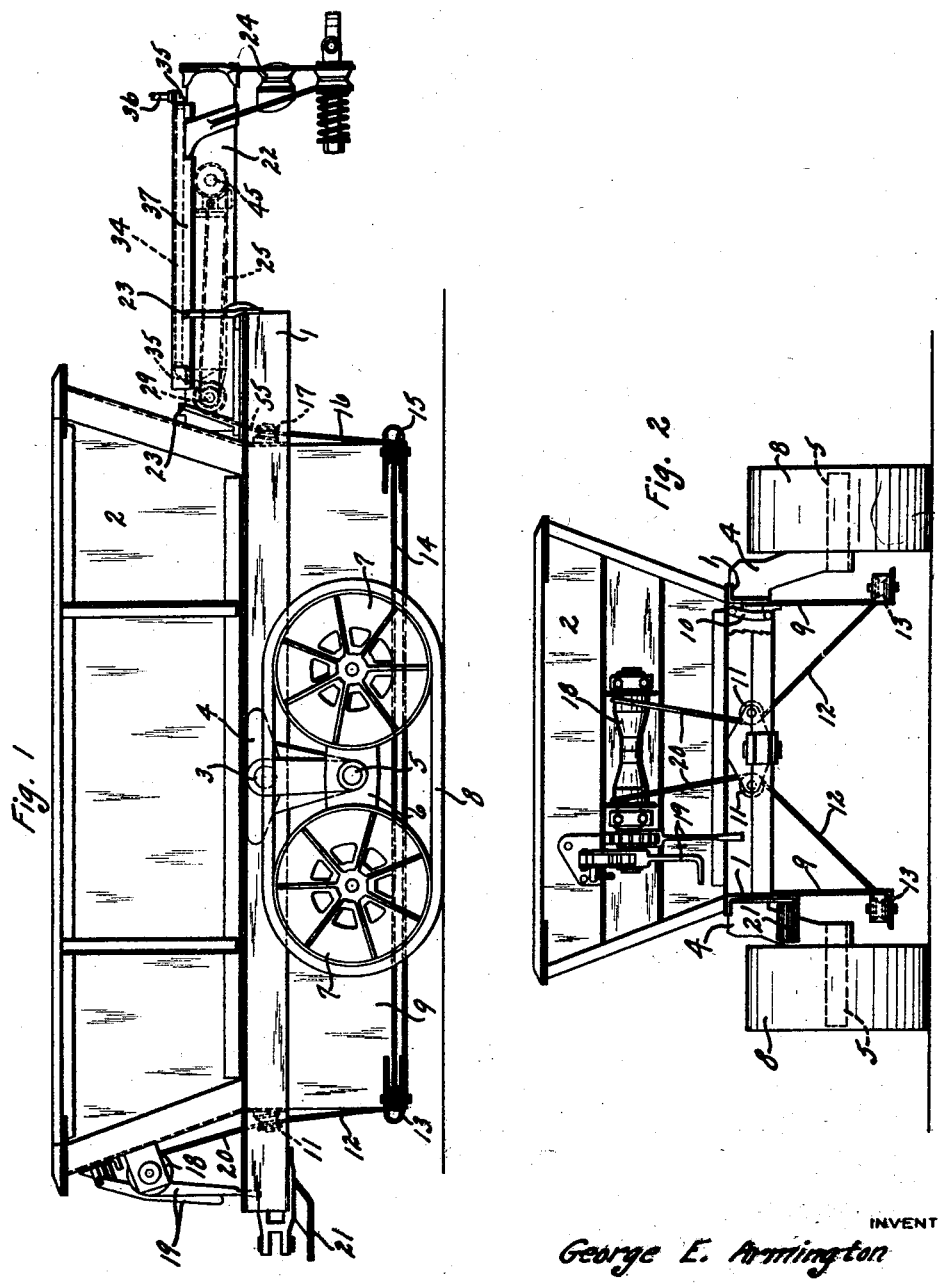

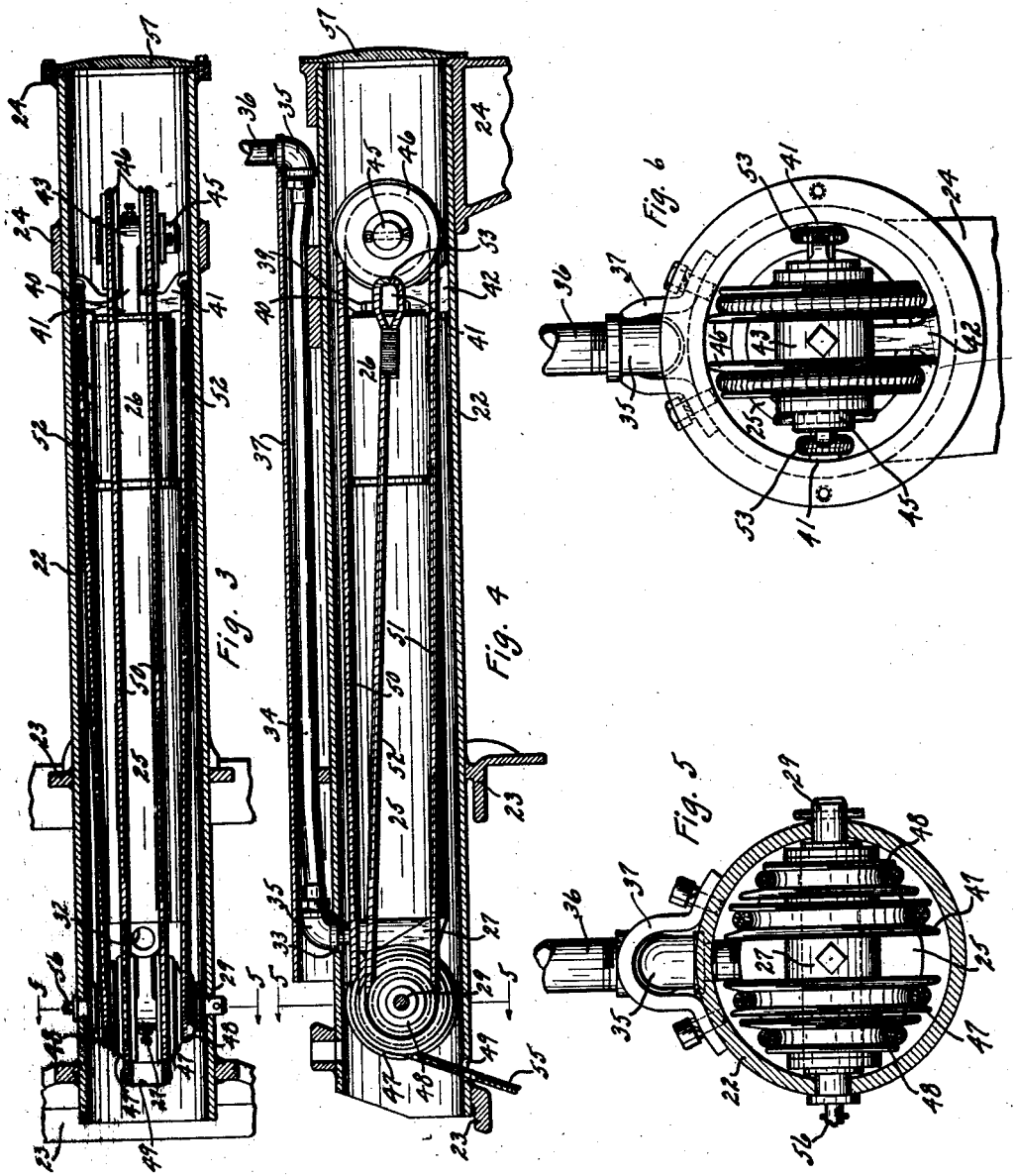

1,817,602

UNITED STATES PATENT OFFICE

GEORGE E. ARMINGTON, OF CLEVELAND, OHIO, ASSIGNOR TO THE EUCLID CRANE & HOIST COMPANY, OF EUCLID, OHIO, A CORPORATION OF OHIO

DUMP WAGON DOOR OPERATING GEAR

Application filed November 21, 1930. Serial No. 497,173.

This invention relates to dump vehicles and more particularly to means therein for operating the dumping doors thereof.

The type of vehicle contemplated is that wherein the doors are mounted for swinging movement, to dump by gravity; wherein the doors are closable by hand.

Such a vehicle is illustrated and described in Patent No. 1,752,056, issued March 25, 1930, to Arthur P. Armington and Stewart F. Armington, and as reference to this patent will show, the vehicle includes a tubular drawbar rigidly associated with the frame and body parts of the vehicle. In said patent distinction is made between the cart or two-wheeled type of vehicle as against a wagon or four-wheeled type, so that the vehicle with which this invention is concerned is more particularly of cart type. However, such distinction is unnecessary here, so that hereinafter we may make reference to the vehicle merely by the homely term "wagon."

It is an object of the present invention to improve such type of vehicle by the addition thereto of power-actuated means for controlling the dumping doors, so arranging the parts that the doors may be controlled optionally and at any time by either power or hand.

A further object of the invention is to arrange the power-actuated means within the hollow of the drawbar.

Still another object of the invention is to arrange the power-actuated means as an assembly unit easily added to or removed from the vehicle.

The exact nature of the invention together with further objects and advantages thereof will be apparent from the following description taken in connection with the accompanying drawings, in which Figs. 1 and 2 are side and rear elevations respectively of a vehicle wherein the features of my invention are embodied, the doors being shown in dumping position; Figs. 3–6 are views of the power-actuated unit in position in the drawbar, Figs. 3 and 4 being sections in plan and elevation respectively and Fig. 5 being a sectional elevation as in the plane of line 5—5, Figs. 3 and 4, Fig. 6 being a front end elevation with closure cap removed; Figs. 7 and 8 are plan and vertical sections respectively of the cooperative piston and cylinder parts employed; Fig. 9 is an enlarged end view of the parts appearing in Figs. 7 and 8; and Fig. 10 is a transverse section through these parts as in the plane of line 10—10, Figs. 7 and 8.

With reference now to the drawings, the vehicle there appearing includes a body composed of an open frame 1 and an open bottom hopper 2 mounted thereon; with mobile supporting means therefor including an arched axle carried by creeper assemblies. More particularly the axle includes the transverse member 3 extending between brackets 4 secured each with one of the side frame members, each bracket extending downwardly of the frame and carrying the stub shaft 5. Upon each stub shaft is mounted a rock beam 6 carrying at its ends wheels 7, an endless tread linkage 8 being trained about the wheels 7. By this means the body is supported at sufficient elevation that the doors 9 may clear the ground when lowered to dumping position which is that shown. There are two doors, each mounted for movement generally about one of the side frame members, from depending dumping position, inwardly and upwardly to closed position beneath the transverse axle member 3. As shown the doors are carried by a number of links 10 spaced along their confined edges so that the door movement is generally a swinging one but not about fixed axes.

Each door is operated by a length of line, which may be flexible steel cable, chain, or the like, the line passing from the rearward end of the wagon over a sheave 11 mounted on the end frame member, with a stretch 12 extending to a sheave 13 at the door corner, thence by a stretch 14 to a sheave 15 on the opposite door corner, thence by a stretch 16 over a sheave 17 on the opposite end of the vehicle. The sheaves 13 and 15 being located on the free edges of the doors, it will be apparent that a pull on either line from either end thereof, the opposite end being fixed, will effect closing of the corresponding door; so that the doors may be simultaneously opened or closed by coincident actuation of both lines from either end of the wagon, and the wagon thus loaded and dumped as desired.

That the doors may be controlled by hand, a winding drum 18 is mounted upon the rear of the wagon and arranged to be controlled, through suitable ratchet and pawl means, by a pair of handles 19, one of the handles being adapted to cause winding operation of the drum, and the other being adapted to trip the drum. The rear end of each door-actuating line is secured upon the drum 18 so that stretches 20 lead from the sheaves 11. A step platform 21 is provided adjacent the handles 19 to support an operator in position to conveniently manipulate these handles. It will be obvious from the foregoing that, the two lines being secured at their forward ends, the lines may be wound upon the drum to close the doors, and subsequently the lines and thus the doors may be released to dump the load.

Drawbar means are provided at the front end of the wagon, and include a forwardly extending member 22 secured with the wagon frame as by a pair of brackets 23, and a hitch member 24 downwardly extending from the forward end of the member 22. The drawbar member 22 is hollow, preferably tubular as indicated Figs. 3 and 4, and the brackets 23 and hitch member 24 are preferably secured therewith as by the welding indicated in the drawings. This drawbar arrangement will be found more particularly described in Patent No. 1,716,810, issued June 11, 1929 to Arthur P. Armington and Stewart F. Armington.

According to my invention I arrange power-actuated means within the hollow of this drawbar member 22, for connection with the forward ends of the two door-controlling lines. To this end I provide a pair of cooperative cylinder and piston parts 25 and 26. The cylinder part has a head 27 with a through transverse opening 28 to receive a pin 29. The drawbar member 22 at its rear end has opening to receive this pin 29 whereby the head end of the cylinder may be secured within the drawbar yet easily removable therefrom as by simple withdrawal of the pin 29. The head 27 has an opening 30 leading from the hollow 31 of the cylinder to a connection 32. The drawbar member 22 has an opening 33 positioned to be aligned with the opening 32 when the pin 29 is in place; so that connections including the flexible tubing 34 and the elbow fittings 35 may be arranged in communication with the hollow 31 of the cylinder. A pipe line 36 may be connected with a source of fluid under pressure such as the usual pump with which the tractor to which the wagon is hitched, may be equipped. A cover 37 is secured upon the drawbar member 22 to protect the tubing 34.

The piston member 26 may be hollow as indicated but with its end closed by a cap 38 welded thereupon as indicated, which cap may have an opening 38a for a removable plug by which trapped air may be released. Secured with the cap 38 as by bolts 39 is a cross head member 40. This cross head member has a pair of laterally extending arms 41 and a downwardly extending foot 42, these last three parts being of proper dimension to bear upon the inner surface of the drawbar 22 and thus support and position the piston head for sliding movement therein. The cross head also has an extension 43 with an opening 44 to receive a pin 45.

On the pin 45, and one upon either side of the extension 43, are mounted a pair of sheaves 46. On the pin 29 on either side of the head 27, are a pair of sheaves 47 and 48. The sheaves are of such diameter and their flanges so proportioned as indicated Figs. 3 to 6, that each will turn freely upon its pin with suitable clearance from the sides of the drawbar member 22 to prevent the cable from leaving the sheave. The rear end of the drawbar member 22 closely abuts the forward end of the wagon body and is provided with a downwardly opening hole 49. The forward end of each door-operating line is led up through this hole, over one of the sheaves 47, forwardly along a stretch 50 to and over the corresponding sheave 46, rearwardly with a stretch 51 to and over the corresponding sheave 48, and thence forwardly with a stretch 52. At the end of the stretch 52 the cable is made fast as by the eye 53, with the corresponding arm 41 of the piston head, a notch 54 being provided therein for the purpose. By the described arrangement a 3:1 multiplication is had upon the motion of the piston 26, that is, the stretch 55 of each line leading between sheaves 47 and 17 will move three times the distance moved by the piston.

The parts are so proportioned and arranged that the stroke of the piston, within the drawbar member 22 moves the lines a distance sufficiently to move the doors 9 between full-closed and full-open position. The length of the lines is such that when the drum 18 is unwound and the piston 26 in innermost position in its cylinder 25, the doors 9 will be fully open. Thus either by winding movement of the drum 18 or by fluid pressure within the cylinder 25, the doors may be raised to closed position. The pipe line 36 is, of course, provided in the usual manner with the usual valve under the control of the operator of the tractor whereby movement of the piston 26 may be controlled.

The usual fluid by which the piston is operated, is oil, and lubrication of the parts is nicely provided by leakage thereof between piston and cylinder; capillary action distributing this oil to the cross head bearings and thence to the sheaves, at the forward end of the power assembly. At the rearward end of the assembly, hand lubrication may be had as through a grease fitting 56 in the end of the pin 29 which may be drilled for lubricant distribution to its sheaves. A cap closure 57, shown Figs. 3 and 4, may preferably be provided in the forward end of the drawbar for protection of the power assembly from dust or dirt entering therethrough. The rear end is well protected by the abutting relation of the drawbar member 22 with the wagon body 2.

It will be apparent that the cylinder and piston unit, or power assembly, may be nicely added to or removed from the wagon any time by simply breaking the piping connection at the opening 32 and pulling the pin 29. If this unit is to be removed the door-operating lines must be made fast at the forward end of the wagon; otherwise, as by mere failure of hydraulic power, the doors may at any time be operated by hand from the rear of the wagon.

What I claim is:

1. In a wagon of the class described and having a dumping door and a hollow drawbar, hydraulic power-actuated means of piston and cylinder type and associated sheaves within the hollow of the drawbar, and a line connecting between said means and said door for operating the latter by the former said line passing over said sheaves.

2. In a wagon of the class described and having a dumping door and a tubular drawbar, power-actuated means within the hollow of the drawbar and connection between said means and said door for operating the latter by the former, said means comprising cooperative cylinder and piston parts, one of said parts being secured with the drawbar and the other having a head bearing upon the inner surface thereof.

3. In a wagon of the class described and having a dumping door and a tubular drawbar, power-actuated means within the hollow of the drawbar, connection between said means and said door for operating the latter by the former, said means comprising cooperative cylinder and piston parts, and sheaves carried by said parts, said connection being trained over said sheaves to multiply the relative motion of said parts.

4. In a wagon of the class described and having a dumping door and a tubular drawbar, power-actuated means within the hollow of the drawbar, connection between said means and said door for operating the latter by the former, said means comprising cooperative cylinder and piston parts, one of said parts being secured with the drawbar and the other having a head bearing upon the inner surface thereof, and sheaves carried by said parts, said connection being trained over said sheaves to multiply the relative motion of said parts.

5. In a wagon of the class described and having a dumping door and a tubular drawbar, power-actuated means within the hollow of the drawbar and connection between said means and said door for operating the latter by the former, said means comprising cooperative cylinder and piston parts, the cylinder part being secured with the drawbar and the piston part having a head movable upon the inner surface thereof.

6. In a wagon of the class described and having a dumping door and a hollow drawbar, power-actuated means within the hollow of the drawbar, hand-actuated means at the rear of the wagon, and rigging associating said door with both said means to be actuated by either thereof.

In testimony whereof I hereby affix my signature.

GEORGE E. ARMINGTON.